United States Patent
Phillips et al.

(10) Patent No.: US 9,613,257 B2
(45) Date of Patent: Apr. 4, 2017

(54) GLOBAL IDENTIFICATION (ID) AND AGE VERIFICATION SYSTEM AND METHOD

(71) Applicant: ARISTOTLE INTERNATIONAL, INC., Washington, DC (US)

(72) Inventors: Dean Aris Phillips, Washington, DC (US); Mathew W. Packer, Woodland Hills, UT (US); Michael Bolcerek, San Francisco, CA (US)

(73) Assignee: ARISTOTLE INTERNATIONAL, INC., Washington, DC (US)

( * ) Notice: Subject to any disclaimer, the term of this patent is extended or adjusted under 35 U.S.C. 154(b) by 0 days.

(21) Appl. No.: 14/198,855

(22) Filed: Mar. 6, 2014

(65) Prior Publication Data
US 2014/0254893 A1 Sep. 11, 2014

Related U.S. Application Data

(60) Provisional application No. 61/774,412, filed on Mar. 7, 2013.

(51) Int. Cl.
*G06K 9/00* (2006.01)
*G06F 21/31* (2013.01)
*G06Q 30/06* (2012.01)

(52) U.S. Cl.
CPC ......... *G06K 9/00221* (2013.01); *G06F 21/31* (2013.01); *G06Q 30/0609* (2013.01)

(58) Field of Classification Search
CPC .............. H04L 63/0861; H04L 9/0866; G06K 9/00228; G06K 9/00288; G06K 9/00275; G06K 9/00221; G06K 9/00892; G06K 2009/00322; G06F 21/32; G06F 21/34; G06F 21/31; G06Q 20/40145; G06Q 30/0609
USPC ............. 382/118, 218, 115, 124, 140; 726/7
See application file for complete search history.

(56) References Cited

U.S. PATENT DOCUMENTS

| | | | |
|---|---|---|---|
| 8,355,407 B2 * | 1/2013 | Wookey et al. | 370/401 |
| 2001/0025272 A1 * | 9/2001 | Mori | G06F 21/31 705/76 |
| 2013/0219480 A1 * | 8/2013 | Bud | 726/7 |

* cited by examiner

Primary Examiner — Manuchehr Rahmjoo
(74) Attorney, Agent, or Firm — DLA Piper LLP (US)

(57) ABSTRACT

A multi-process identity and/or age verification process and system for user's connected to a network such as the Internet. The process and system verify the identity of the user by: verifying personal information of the user; verifying identification documentation associated with the user; and conducting an online face-to-face verification of the user over the network.

16 Claims, 7 Drawing Sheets

Call Queue

| | Skype Status | Skype Display Name | RequestID | Name |
|---|---|---|---|---|
| Open | Bubby Pending... | Echo / Sound Test Service | 3387 | POSHAN KUMAR |
| Open | Bubby Pending... | Echo / Sound Test Service | 3408 | SAURAEH WEST |
| Open | Bubby Pending... | Echo / Sound Test Service | 3420 | ANOUR SINGH |
| Open | Bubby Pending... | Echo / Sound Test Service | 3455 | JOHN SMITH |
| Open | Bubby Pending... | Echo / Sound Test Service | 3477 | JILL MORLEY |

502

Your Active Queue

| | Status | Skype Display Name | IsNow | RequestID | Name | Skype Name | Production |
|---|---|---|---|---|---|---|---|
| Open | Buddy (Online / Has Video True) | Jane Doe | Active | 3507 | Jane Doe | J. Doe | False |

GLOBAL IDENTIFICATION (ID) AND AGE VERIFICATION SYSTEM AND METHOD

CROSS-REFERENCE TO RELATED APPLICATION

This application claims priority from U.S. Provisional Application Ser. No. 61/774,412 filed Mar. 7, 2013, the entirety of which is incorporated herein by reference.

FIELD OF THE INVENTION

Embodiments of the present invention relate generally to the field of personal identification and age verification of an individual accessing a site or service connected to the Internet or other network.

BACKGROUND

There currently exists the need to verify the identity and age of individuals accessing certain web sites or services operating over the Internet or other network. For example, in the online gaming industry, site operators providing online gaming services, which are universally prohibited to users under a certain age, must ensure that minors do not have access to the site or its services. These site operators must adhere to strict government regulations on how the identification and age verification must be achieved. In Germany, for example, the provision for gaming operators is difficult to implement because the Altersüberprüfung, as stipulated in the Commission for Youth (KJM), requires "face-to-face" verification (e.g., personal contact) in addition to requiring verified documents. Thus far, providers have had the limited options of using the PostIdent from Deutche Post, mobile phone operators, banks, and some limited service providers to meet these requirements.

Existing methods of verification using PostIdent or services like verify-U are cumbersome and expensive from 10 Euro to around 3 Euro, respectively. "Closed user" methodologies are currently time consuming and do not utilize the tools available over the Internet. In Germany, for example, this is why closed users systems are rarely used in the pornography industry, which is why most content comes from outside of Germany without the necessary age verification. This situation is not limited to the pornography industry and is undesirable.

The JMStV (Youth Media Protection State Agreement or Jugendmedienschutz-Staatsvertrag/JMStV) does not specify any procedure for certifying closed user groups or age verification systems. The KJM has therefore developed a positive assessment procedure and assesses concepts at the request of a manufacturer or service provider. In this way, the protection of minors on the Internet can be improved; at the same time, the service offers more legal and planning security to the providers. Devising an Internet offer in line with the requirements of the JMStV is the responsibility of the content provider, not the KJM. The provider can make use of technical concepts for the protection of minors that have already been given a positive rating by the KJM.

The KJM assesses both complete package solutions as well as partial solutions (modules) for closed user groups. The assessment of modules makes it easier for users to implement their concepts. For instance, providers can combine modules, which have been positively assessed by the KJM to produce a modular comprehensive solution meeting the requirements of the JMStV and the KJM. Modules can, for instance, be procedures for identification only, authentication, or for other major components of an age-verification system. The KJM only assesses concepts. The assessment of issues relating to content depends on the practical implementation of the closed user groups.

Accordingly, there is a general need for a quick, reliable and inexpensive technique for verifying an online or network user's identity and age.

BRIEF DESCRIPTION OF THE DRAWING

FIG. 5 is an example video confirmation console screen used by the compliance team in accordance with the disclosed principles.

FIG. 6 is an example interactive graphical interface utilized by the compliance team during the process of verifying a user's identity and/or age over a network such as e.g., the Internet, in accordance with the disclosed principles.

SUMMARY OF THE INVENTION

Figure 1:
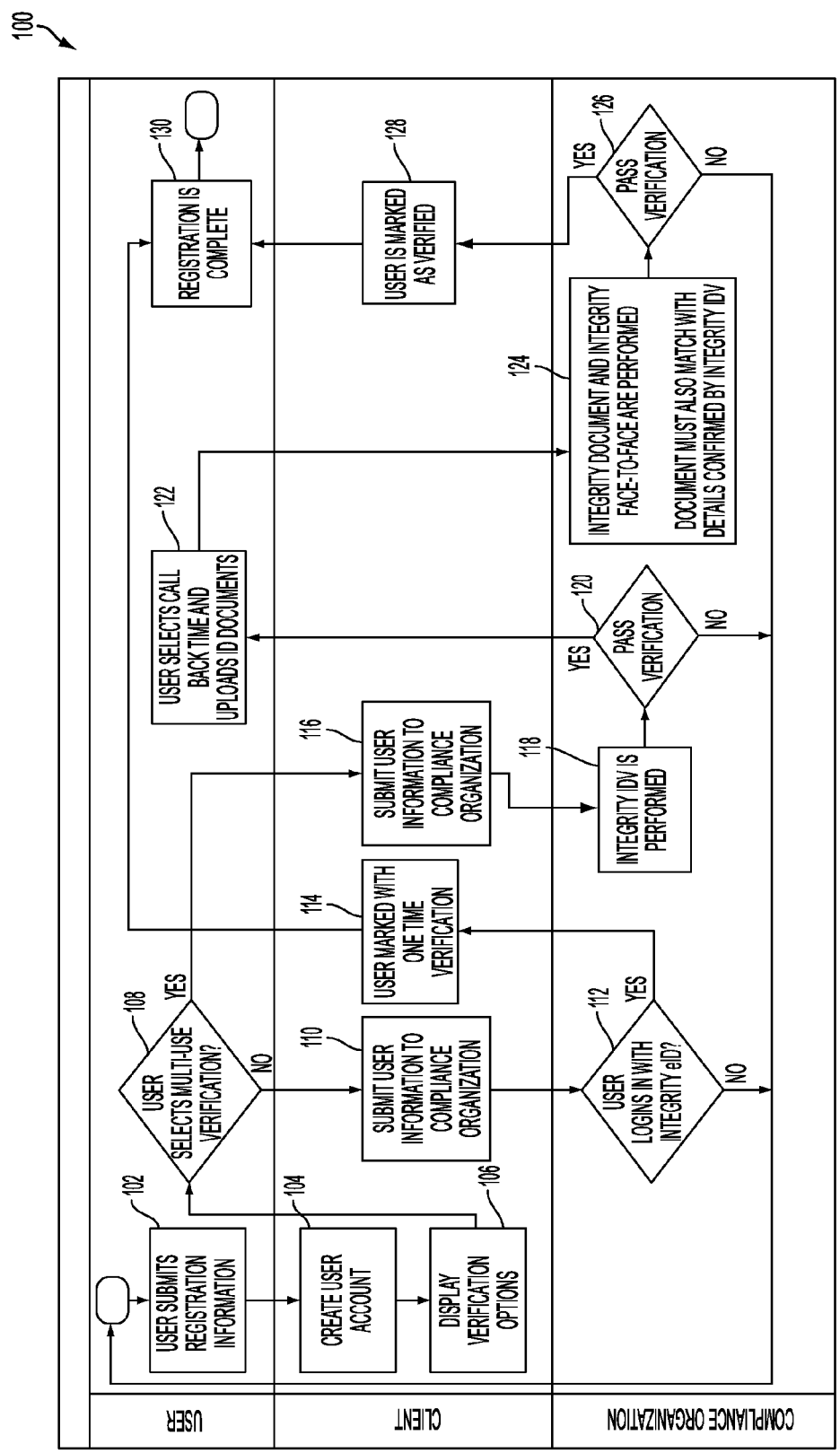
FIG. 1 is an example process flow for an example embodiment of the disclosed invention.

Embodiments disclosed herein provide a multi-process identity and/or age verification process and system for user's connected to a network such as the Internet. The process verifies the identity of the user by: verifying personal information of the user; verifying identification documentation associated with the user; and conducting an online face-to-face verification of the user over the network.

DETAILED DESCRIPTION

In the following detailed description, a plurality of specific details are set forth in order to provide a thorough understanding of the preferred embodiments discussed below. The details discussed in connection with the preferred embodiments should not be understood to limit the present inventions. Furthermore, for ease of understanding, certain method steps are delineated as separate steps; however, these steps should not be construed as necessarily distinct nor order dependent in their performance.

The embodiments of the present invention provide a system and method that implement a multi-process approach to meet and exceed the requirements for identity and age verification in a variety of industries. Although a standalone video verification or a standalone ID document review when performed separately are not sufficient to meet imposed requirements (e.g., of KJM), when these two processes are combined with a third identity verification process, the embodiments of the present invention meet the imposed requirements for identity and age verification (e.g., of the KJM); particularly, when the disclosed method compares submitted profile and payment information against government (e.g., US or German) identity databases, credit databases, and/or publicly available identity data.

It should be appreciated that online gaming and pornography web sites are mere examples of sites and services in which the embodiments disclosed herein can be used for. Moreover, reference to specific government rules or regulations (e.g., Germany's KJM) are not intended to be limiting. It should be appreciated that the embodiments disclosed herein are not to be limited to any particular online service or site or the regulations governing certain sites or services. The embodiments disclosed herein are suitable for any site or service that requires the user to be identified and/or his/her age to be verified over a network such as e.g., the Internet.

The method disclosed herein combines three different identity processes into one full-service offering. To ensure that certain sites or services (e.g., gaming) on the Internet can be only used by adults or meet certain Know Your Customer (KYC) requirements, the disclosed method and system provide for the examination of identity and age in three steps:

(1) Verifying profile information of the site's/service's users/customers by comparing their personal information against identity data and databases that the embodiments of the present invention acquire or receive through gateway providers like credit bureaus or government sources (i.e., a Driver's License) (this step is referred to in the attached method 100 as Integrity IDV).

(2) The system/method reviews the images of identity documents (such as e.g., National ID such as Personalausweis, passport or driver's license) to comply with the standard for such documents. Numerical analysis is applied by way of algorithm, and compliance personnel confirm that the document does not appear to be impaired, altered, or falsified in any way. The document number is also stored with a user specific profile and if an attempt to re-use that document occurs, it is flagged as a fraudulent attempt (this step is referred to in the attached method 100 as Integrity Document).

(3) A compliance team member verifies that the image on the identity document is the same as the individual shown by a webcam or other video device. The user of the webcam must also confirm that he/she is the owner of the account by confirming/entering a PIN or pass code (described below). A photo of the individual holding the identity document and another photo of the identity document is taken to confirm the verification. A visual comparison is made between the identity document first submitted, the document presented during the video interview, and the photo of the individual on the webcam (this step is referred to in the attached method 100 as Integrity face-to-face).

The combination of three separate verification processes into one service provides the best identity and age compliance service in the marketplace. Combining the latest technologies available, a user could enter its profile information, take a photo of its passport, deliver the photo to a system implementing the disclosed method, and have a Skype verification interview all from his/her mobile phone. The disclosed embodiments support all of the latest technologies in each of its processes, which means that site providers (e.g., game operators) can share this capability with their clients, creating a much more enjoyable experience while meeting the strictest of age compliance obligations.

Figure 2:
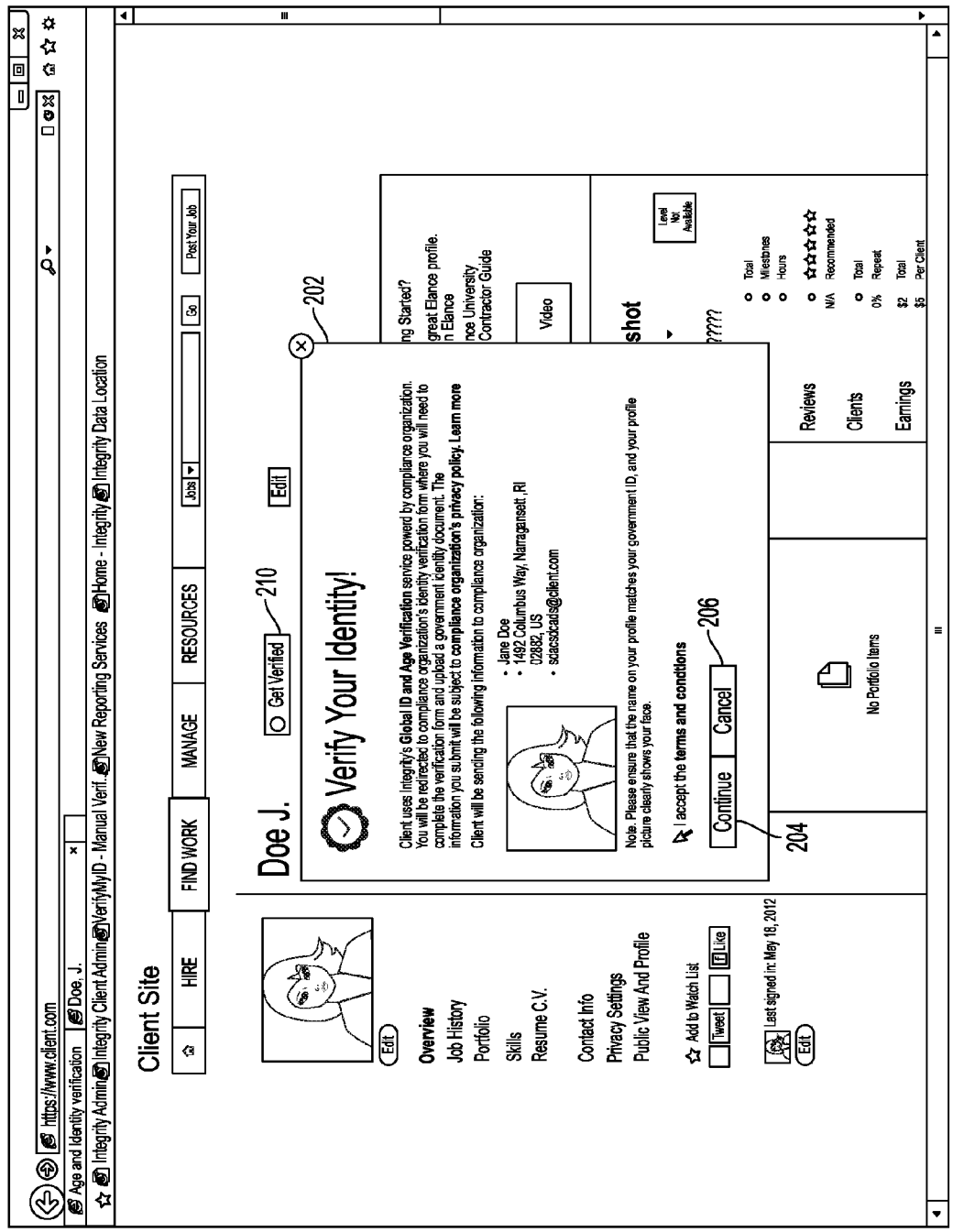
FIG. 2 is an example interactive graphical user interface accessed by a user intending to have his/her identity and/or age verified over a network such as e.g., the Internet.

FIG. 1 is an example process 100 of an example embodiment of the disclosed invention. The process 100 is shown as having three primary actors, (1) the user, (2) the site or service operator (referred to as the "client") and (3) a compliance organization. In one embodiment, the user accesses the client's web site or service using the Internet. Prior to this, the client has contracted with the compliance organization to obtain access to the compliance organization's age and/or identity verification services described herein. The user can access the client's site or service using a computer, cellular telephone, tablet (e.g., iPad®) or any other device capable of communicating over the Internet or other network. An example interface 200 for "getting verified" is shown in FIG. 2. The FIG. 2 interface 200 can be provided by the client or the compliance organization. The interface 200 provides the user with certain information 202 and options 204, 206 to continue with the verification process or not.

Figure 3:
FIG. 3 is another example interactive graphical user interface accessed by a user intending to have his/her identity and/or age verified over a network such as e.g., the Internet.

In the example process 100 illustrated in FIG. 1, the user submits registration information to the client at step 102. This can be performed using another interactive graphical user interface such as the example interface 300 illustrated in FIG. 3. The interface 300 illustrates fields for as a profile photo 302, first name 304, last name 306, date of birth 308, gender 310 and address 312. The client creates a user account (step 104) and displays verification options to the user's device (step 106). In the illustrated example, the user has the option of selecting a multi-use verification or a one-time (or one-off) verification. It should be appreciated that governing bodies may require different procedures for multi-use verifications and one-time (or one-off) verifications. As such, the disclosed process 100 has flows for both. Accordingly, at step 108 it is determined whether the user has selected a multi-use verification or not. If it is determined that the user selected a one-time verification (i.e., a no at step 108), the client submits the user's information to the compliance organization at step 110. At step 112, the compliance organization determines if the user has logged in using an approved electronic identification mechanism (eID) (this process is referred to in FIG. 1 as "Integrity eID"). One known eID mechanism includes the Norwegian eID mechanism. It should be appreciated that the disclosed embodiments are not limited to eID and that other techniques may be used. As shown in FIG. 1, if the compliance organization has determined that the user has chosen one-time verification, and has logged on with an approved eID mechanism (i.e., a yes at step 112), the client is informed and the client marks the user with the one-time verification (step 114). At this point, registration is complete (step 130) and the process 100 ends. Although not shown in FIG. 1, a message, window or other alert can be displayed on the user's device indicating that the verification was successful.

As shown in FIG. 1, if the compliance organization has determined that the user has chosen one-time verification, but has not logged on with an approved eID mechanism (i.e., a no at step 112), the compliance organization does not verify the user and the method 100 can conclude or re-start at step 102 to allow the user another chance to get verified. Although not shown in FIG. 1, a message, window or other alert can be displayed on the user's device indicating that the verification was not successful.

If it is determined that the user selected a multi-use verification (i.e., a yes at step 108), the client submits the user's information to the compliance organization at step 116. The compliance organization then initiates the "Integrity IDV" process at step 118. During the Integrity IDV process, profile information (e.g., name, address, postal code) of the user is verified by comparing the user's personal information against identity data and databases that the organization acquires or receives through gateway providers like credit bureaus. The compliance organization may use publicly available personal information to validate personal information provided by the user. Example databases used for validation include one or more of: Electoral Rolls, Utility Rolls, Taxpayer Rolls, Property Rolls, Credit Reference Registers, Driver License Registers, Motor Vehicle Registers, and National ID register.

At step 120, a check is made to determine whether the user passed the verification step. If the user's information is not verified during the Integrity IDV process (i.e., a no at step 120), the compliance organization does not verify the user and the method 100 can conclude or re-start at step 102 to allow the user another chance to get verified. Although not shown in FIG. 1, a message, window or other alert can be displayed on the user's device indicating that the verification was not successful.

Figure 4:
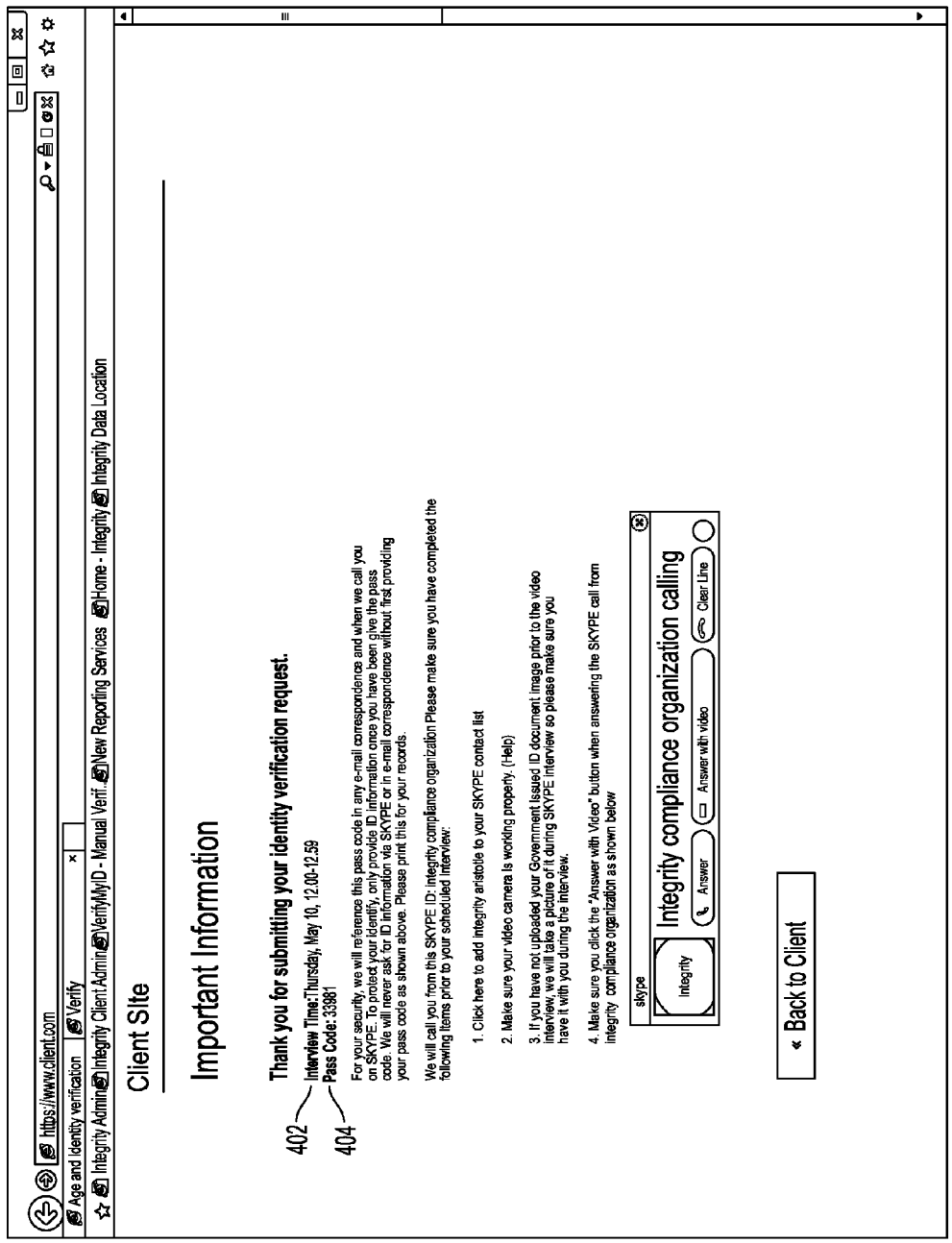
FIG. 4 is an example screen displayed to a user during the process of having his/her identity and/or age verified over a network such as e.g., the Internet, in accordance with the disclosed principles.

If the user's information is verified by the Integrity IDV process (i.e., a yes at step 120), the compliance organization presents an interactive interface, menu, etc. through which the user can select a call back time for the "face-to-face" verification process at step 122. The user will also be able to upload an identification document (e.g., a passport or driver's license) to be used in a subsequent document verification process. FIG. 4 illustrates an example window/screen 400 displayed to a user once the call back time/interview (block 402) is scheduled. In one embodiment, the window will also contain a pass code that the user will need to provide during the interview. Personnel at the compliance organization, e.g., the compliance or identification specialist, will use a video confirmation console screen (such as screen 500 shown in FIG. 5) to organize and setup the confirmation/verification interviews.

At this point, the Integrity Document and Integrity face-to-face processes are performed at step 124. The Integrity Document process reviews the image of the user's identity document (such as e.g., National IDs, such as a Personalausweis, passport or driver's license) to see if it complies with the standard for such documents. Numerical analysis is applied by way of algorithm, and compliance personnel confirm whether the document does not appear to be impaired, altered, or falsified in any way. The document number is also stored with a user specific profile and if an attempt to re-use that document occurs, it is flagged as a fraudulent attempt. A suitable mathematical algorithm is used, which can validate information provided within a government issued passport number, National ID number, Driver License Number where the government number can be discerned to be valid and/or certain elements of this number relate to other provided information or exceed a certain threshold such as a date of birth requirement. If the document appears to be impaired, altered, etc., the Integrity Document test is marked as failed.

Figure 6:
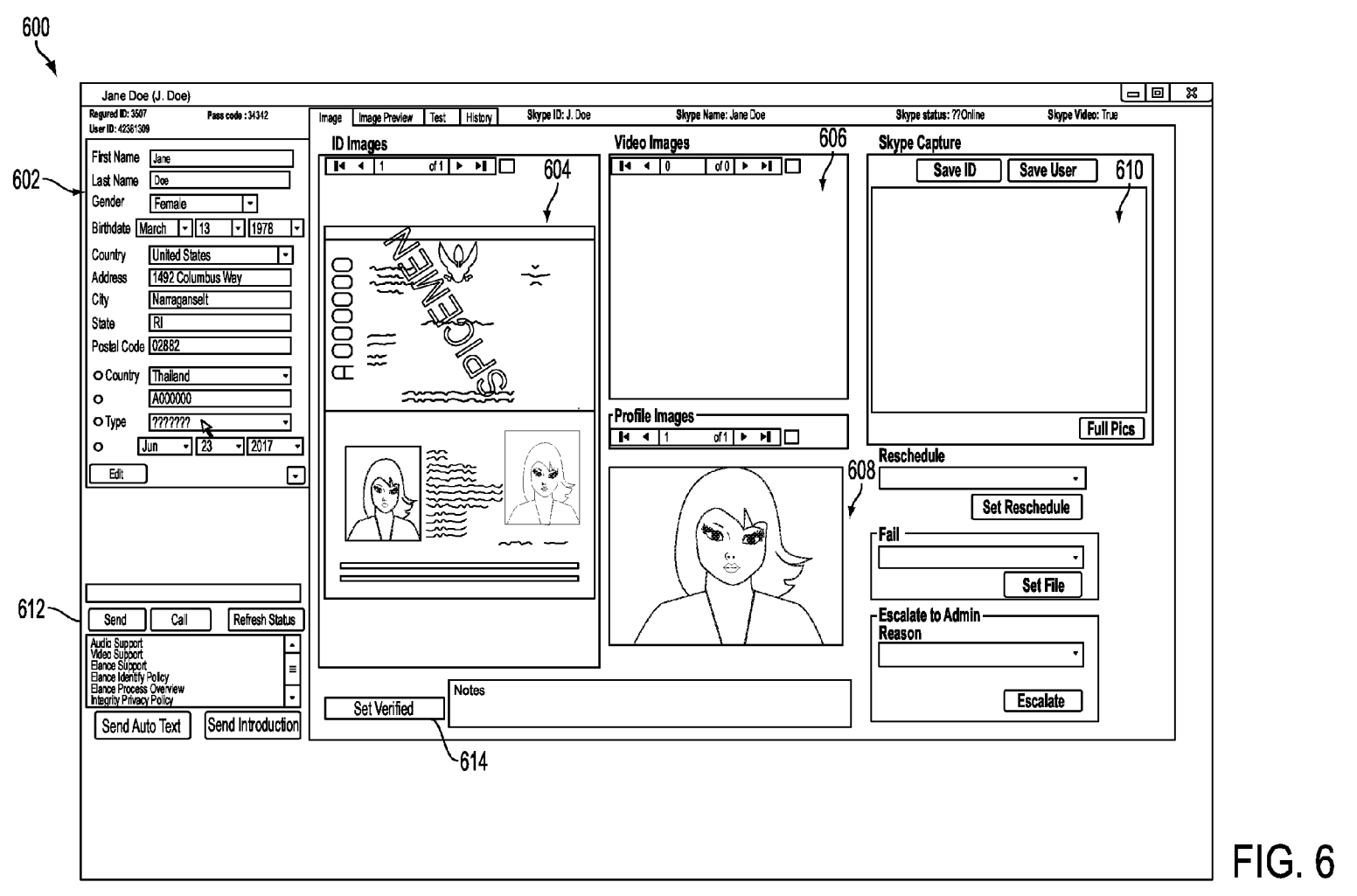

The Integrity face-to-face process utilizes an interactive graphical user interface such as the interface 600 illustrated in FIG. 6. The example interface 600 includes windows 606, 608, 604 to respectively display the user's web cam video images, his/her photo image, his/her identification document (shown in FIG. 6 as a passport), and menu selections 612 for running the video interview. A compliance team verifies that the image on the identity document is the same as the individual on the webcam or video device. The user of the webcam must also confirm they are the owner of the account by entering/confirming the PIN or pass code previously provided (block 404 of FIG. 4). During the process, a photo of the individual holding the identity document and another photo of the identity document is taken to confirm the verification. A visual comparison is made between the identity document first submitted, the document presented during the video interview, and the photo of the individual on the webcam.

At step 126, a check is made to determine whether the results of the Integrity Document and fact-to-face tests passed or failed. If the user's information is verified by both the Integrity Document and face-to-face processes (i.e., a yes at step 126), the compliance organization alerts the client, which marks the user as being verified at step 128. At this point the registration is complete (step 130) and the process 100 ends. Although not shown in FIG. 1, a message, window or other alert can be displayed on the user's device indicating that the verification was successful.

As shown in FIG. 1, if the user's information is not verified by both the Integrity Document and face-to-face processes (i.e., a no at step 126), the compliance organization does not verify the user and the method 100 can conclude or re-start at step 102 to allow the user another chance to get verified. Although not shown in FIG. 1, a message, window or other alert can be displayed on the user's device indicating that the verification was not successful.

Figure 7:
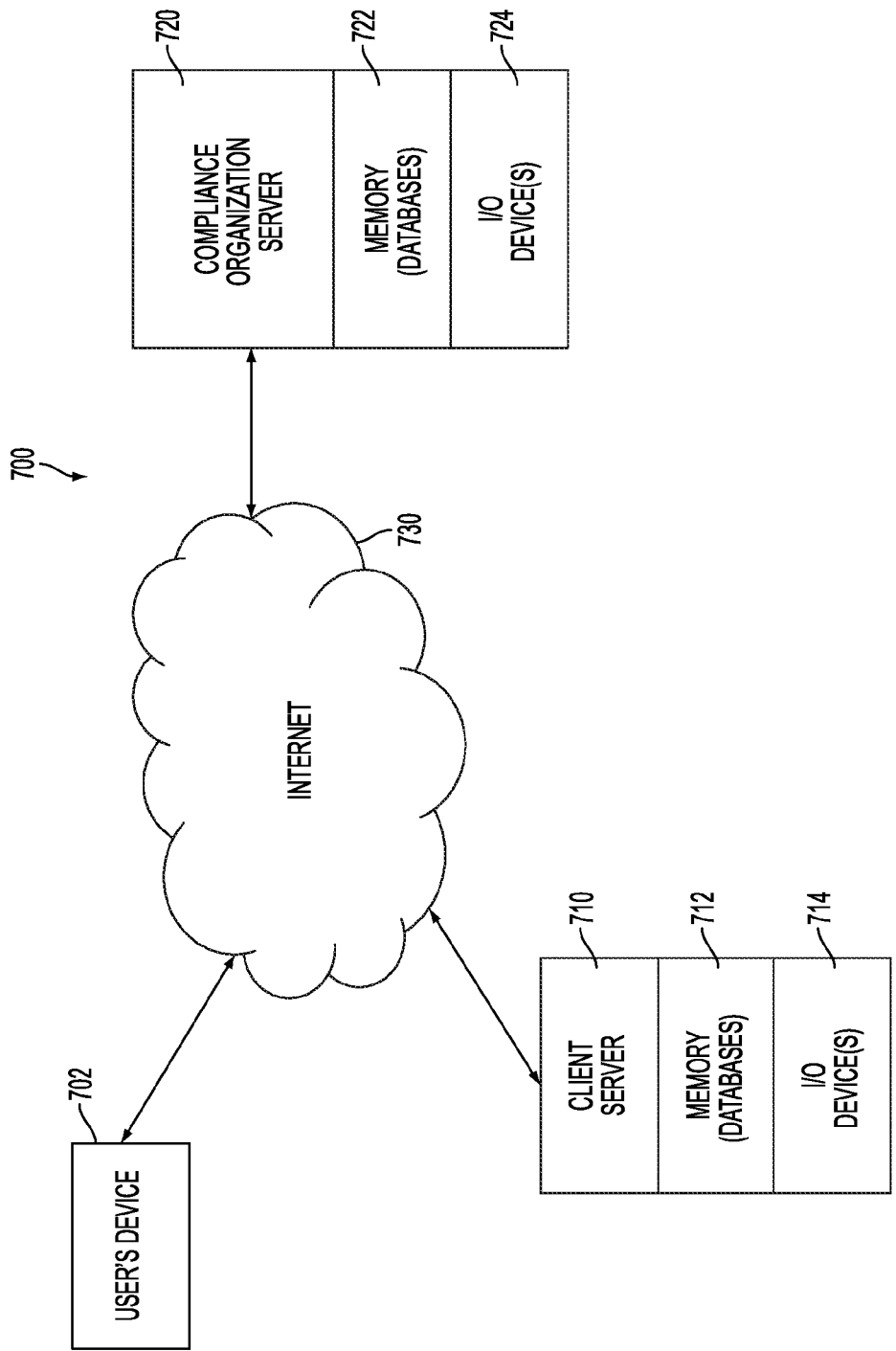
FIG. 7 is an example system in accordance with the disclosed principles.

FIG. 7 illustrate an example system 700 comprising a user device 702 that connects to the client's server 710 and the compliance organization's server 720 over a network 730 shown as the Internet. As mentioned above, the user's device 702 can be a computer, cellular telephone, tablet (e.g., iPad®) or any other device capable of communicating over the Internet or other network. The client's server 710 can include input/output devices 714 such as displays, scanners, printers, etc. as well as internal or externally connected memory devices 714 used to store relevant databases, user information and verification algorithms used during the above-described processes. Similarly, the compliance organization's server 720 can include input/output devices 724 such as displays, scanners, printers, etc. as well as internal or externally connected memory devices 722 used to store relevant databases, user information and verification algorithms used during the above-described processes. The database information could also include relevant government or other regulatory body rules/regulations for specific sites or services. The memory devices 712, 722 could be used to store computer programs and instructions, which when executed by the servers 710, 720 or other computer device causes the server to perform the functions described herein.

To summarize, the disclosed method 100 and system 700 can verify a user over the Internet or other network using a multi-process technique when desired (e.g., for multi-use verifications). To start the verification process, a user of a client site or service simply clicks the "Get Verified" button (software button 210 on FIG. 2) on the user's profile page of the client's site. The client uses the disclosed Global ID and Age Verification service provided by the compliance organization. The user is redirected to the compliance organization's identity verification form where they provide additional ID information and upload a government-issued identity document (see FIG. 3). The user supplies the information requested on the form and will also be required to upload a previously scanned, photographed or imaged picture of their government issued ID document. Finally, the user selects an interview time and then clicks the "SUBMIT" button. The user is presented with a confirmation screen that also comprises a pass code or PIN needed for the web cam interview (see FIG. 4). A compliance organization ID verification specialist will then call the user at the specified time.

Video interviews are initiated by an ID verification specialist from the video verification console (FIG. 5). All pending interviews are shown in the top window 502 and all interviews assigned to a specific verification specialist are shown in the bottom window 504. The video verification request for the current user is shown in the active queue region of the console. The personnel can click "OPEN" to view the user's verification request. Referring to FIG. 6, the graphical user interface 600 is presented to the compliance specialist. The user's ID information is shown in portion 602. The ID document image that was uploaded by the user is shown on a portion 604 of this interface 600. The user's profile picture from the client's site is shown on another portion 608 of the interface 600. During the video interview, the verification specialist will take a picture of the user and it will be displayed on yet another portion 610 of the interface 600. To call the user, the specialist clicks the "call" button from selection 612. The verification specialist then reviews the ID documents and the associated information and if it is correct, clicks "SET VERIFIED" (block 614). The user's profile now displays the "verified" seal (not shown).

The disclosed method 100 and system 700 can be used for age and identity verification (as described above), brand protection, anti-fraud protection, screening for sex offenders, improving customer targeting, and creating child-safe spaces on the Internet or other network. Advantages of the disclosed method and system include its affordability, easy setup, fast results, key demographics, global coverage and industry leading features.

It should be appreciated that the disclosed system and method are not limited solely to using third party sources of user identity data/information and that the compliance organization (or even the client) can maintain user identity information such as e.g., social security numbers or driver's license information in its own database (i.e., an identity database as part of the system described above); moreover, the information could be accessed through a gateway of supplementary sources such as a credit reference agency, for example. For example, in the US online gaming industry it is common to have a credit, consumer or government roll for users based on this type of user identity information. The credit consumer or government roll and the corresponding user identity information (e.g., user's social security number and driver's license) can reside with the compliance organization or client system, if desired. Thus, the Integrity IDV process would use this locally accessible user identity information instead of, or in addition to, the other sources of identity information described above.

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

Additionally, the purpose of the Abstract is to enable the patent office and the public generally, and especially the scientists, engineers and practitioners in the art who are not familiar with patent or legal terms or phraseology, to determine quickly from a cursory inspection the nature of the technical disclosure of the application. The Abstract is not intended to be limiting as to the scope of the present inventions in any way.

What is claimed is:

1. A computer implemented multi-process identity and/or age verification method for a user connected to a network, said method comprising:
    verifying, at a computer device, personal information of the user that was input by the user;
    verifying, at the computer device, identification documentation associated with the user by:
        analyzing an image of the identification documentation to determine whether elements within the image of the identification document were impaired or altered as compared to elements contained in a standard for the identification document, and
        performing a numerical and algorithmic analysis on a document number associated with the identification documentation to determine if the identification documentation is authentic, said analysis being adapted to determine if elements of the document number exceed a predetermined threshold; and
    conducting, using the computer device, a real-time online video face-to-face verification of the user via the network whereby an image of the user on the user's identification documentation is compared to a video image of the user,
    wherein an identity or age of the user is verified upon successful verification of the user's input personal information, successful verification of the user's identification documentation and a determination that the image of the user on the user's identification documentation matches the video image of the user.

2. The method of claim 1, wherein the personal information verification step is performed by comparing the user's personal information against identity data from a government source.

3. The method of claim 1, wherein the personal information verification step is performed by comparing the user's personal information against identity data from a credit bureau.

4. The method of claim 1, wherein the personal information verification step is performed by comparing the user's personal information against identity data from at least one source selected from the group comprising: Electoral Rolls, Utility Rolls, Taxpayer Rolls, Property Rolls, Credit Reference Registers, Driver License Registers, Motor Vehicle Registers, and National ID register.

5. The method of claim 1, wherein the identification documentation comprises one of a National ID, passport or driver's license.

6. The method of claim 1, further comprising:
    storing the document number associated with the identification documentation with a user profile of the user; and
    if it is determined that another user subsequently attempts to use the identification documentation, preventing use of the identification documentation by the another user.

7. The method of claim 1, wherein the online face-to-face verification step further comprises confirming that the user entered a predetermined personal identification number.

8. The method of claim 1, further comprising:
    determining if the user has requested a one-time verification; and
    if it is determined that the user has requested a one-time verification, verifying the user's identity and/or age using an electronic identification process.

9. A system for implementing a multi-process identity and/or age verification method for a user connected to a network, said system comprising:

a server computer, said server computer:
  verifying personal information of the user that was input by the user;
  verifying identification documentation associated with the user by:
    analyzing an image of the identification documentation to determine whether elements within the image of the identification document were impaired or altered as compared to elements contained in a standard for the identification document, and
    performing a numerical and algorithmic analysis on a document number associated with the identification documentation to determine if the identification documentation is authentic, said analysis being adapted to determine if elements of the document number exceed a predetermined threshold; and
  conducting a real-time online video face-to-face verification of the user via the network whereby an image of the user on the user's identification documentation is compared to a video image of the user,
wherein an identity or age of the user is verified upon successful verification of the user's input personal information, successful verification of the user's identification documentation and a determination that the image of the user on the user's identification documentation matches the video image of the user.

10. The system of claim 9, wherein the personal information is verified by comparing the user's personal information against identity data from a government source.

11. The system of claim 9, wherein the personal information is verified by comparing the user's personal information against identity data from a credit bureau.

12. The system of claim 9, wherein the personal information is verified by comparing the user's personal information against identity data from at least one source selected from the group comprising: Electoral Rolls, Utility Rolls, Taxpayer Rolls, Property Rolls, Credit Reference Registers, Driver License Registers, Motor Vehicle Registers, and National ID register.

13. The system of claim 9, wherein the identification documentation comprises one of a National ID, passport or driver's license.

14. The system of claim 9, wherein the server computer:
  stores the document number associated with the identification documentation with a user profile of the user in a database; and
  if it is determined that another user subsequently attempts to use the identification documentation, prevents use of the identification documentation by the another user.

15. The system of claim 9, wherein the server computer confirms that the user entered a predetermined personal identification number.

16. The system of claim 9, wherein the server computer:
  determines if the user has requested a one-time verification; and
  if it is determined that the user has requested a one-time verification, verifies the user's identity and/or age using an electronic identification process.

* * * * *